(12) United States Patent
Mendez

(10) Patent No.: US 7,261,362 B1
(45) Date of Patent: Aug. 28, 2007

(54) CAMPER SHELL FOR VEHICLE

(76) Inventor: Carmen A. Mendez, 18226 Dallas Ave., Riverside, CA (US) 92508-9739

( * ) Notice: Subject to any disclaimer, the term of this patent is extended or adjusted under 35 U.S.C. 154(b) by 0 days.

(21) Appl. No.: 11/538,671

(22) Filed: Oct. 4, 2006

(51) Int. Cl.
*B60P 7/02* (2006.01)
(52) U.S. Cl. ............................ 296/100.12; 296/100.09
(58) Field of Classification Search .......... 296/100.11, 296/100.12, 100.13, 100.09
See application file for complete search history.

(56) References Cited

U.S. PATENT DOCUMENTS

| | | | |
|---|---|---|---|
| 3,688,787 A * | 9/1972 | Feather | 135/129 |
| 4,294,484 A | 10/1981 | Robertson | |
| 4,848,830 A | 7/1989 | Parson | |
| 5,203,603 A | 4/1993 | Hertzberg et al. | |
| D407,062 S | 3/1999 | Patrovich | |
| 6,312,040 B1 * | 11/2001 | Shinohara | 296/100.12 |
| 6,641,201 B1 | 11/2003 | Pietryga et al. | |
| 6,663,167 B2 | 12/2003 | Phillips et al. | |

* cited by examiner

*Primary Examiner*—Joseph D. Pape
(74) *Attorney, Agent, or Firm*—Vincent Tasswari

(57) ABSTRACT

This patent application discloses a camper shell for a vehicle. The camper shell may include folding sections, where a first folding section may include a forward top, a rear top, a right forward side, a right rear side, a right forward fold, and a right rear fold. The forward top may be connected to the rear top and the right forward fold, the rear top may be connected to the right rear fold, the right forward fold may be connected to the right forward side, and the right rear fold may be connected to the right rear side. The camper shell also may include a right post connected to the right rear side near a rear most bottom corner of the right rear side. The camper shell further may include a door connected to the first folding section and a base connected to the folding sections. The base may include a right channel and a left channel.

19 Claims, 8 Drawing Sheets

CAMPER SHELL FOR VEHICLE

BACKGROUND

1. Field of Endeavor

The information disclosed in this patent relates to retractable covers that may be provided as a camper shell to enclose a load-carrying portion of a vehicle.

2. Background Information

Camper shells, sometimes known as toppers or caps, typically are mounted atop a pickup truck's rear bed to protect truck cargo from the elements. These shells generally cover the entirety of the pickup truck bed and may be large enough to be used for camping. However, camper shells most often are used for utility and cargo storage purposes.

There is a wide variety of camper shells available on the market for most pickup trucks. Some camper shells are hard tops fixed to a truck bed and others expand away from the sides of the vehicle. Still others are raised and lowered by pneumatic cylinders. A problem with most camper shells is that they are difficult to remove to permit full open use of a truck bed. It usually takes several people to remove and handle the heavy shell. Once the shell is removed, their large size makes them difficult to store.

Some inventors have attempted to avoid the need to remove the shell to have open access to the truck bed. For example, U.S. Pat. No. 5,203,603 teaches a telescopic camper cap having individual segments. The individual segments may be telescoped into each other to allow some open use of a truck bed. Although a single individual more easily may handle the individual segments of a telescopic camper cap, a problem with this telescopic camper cap is that it does not permit substantially full access to the bed to haul larger or bulky cargo. What is needed is an apparatus and method to overcome these and other problems.

SUMMARY

This patent discloses a camper shell for a vehicle. The camper shell may include folding sections, where a first folding section may include a forward top, a rear top, a right forward side, a right rear side, a right forward fold, and a right rear fold. The forward top may be connected to the rear top and the right forward fold, the rear top may be connected to the right rear fold, the right forward fold may be connected to the right forward side, and the right rear fold may be connected to the right rear side. The camper shell also may include a right post connected to the right rear side near a rear most bottom corner of the right rear side. The camper shell further may include a door connected to the first folding section and a base connected to the folding sections. The base may include a right channel and a left channel.

DETAILED DESCRIPTION

Figure 1:
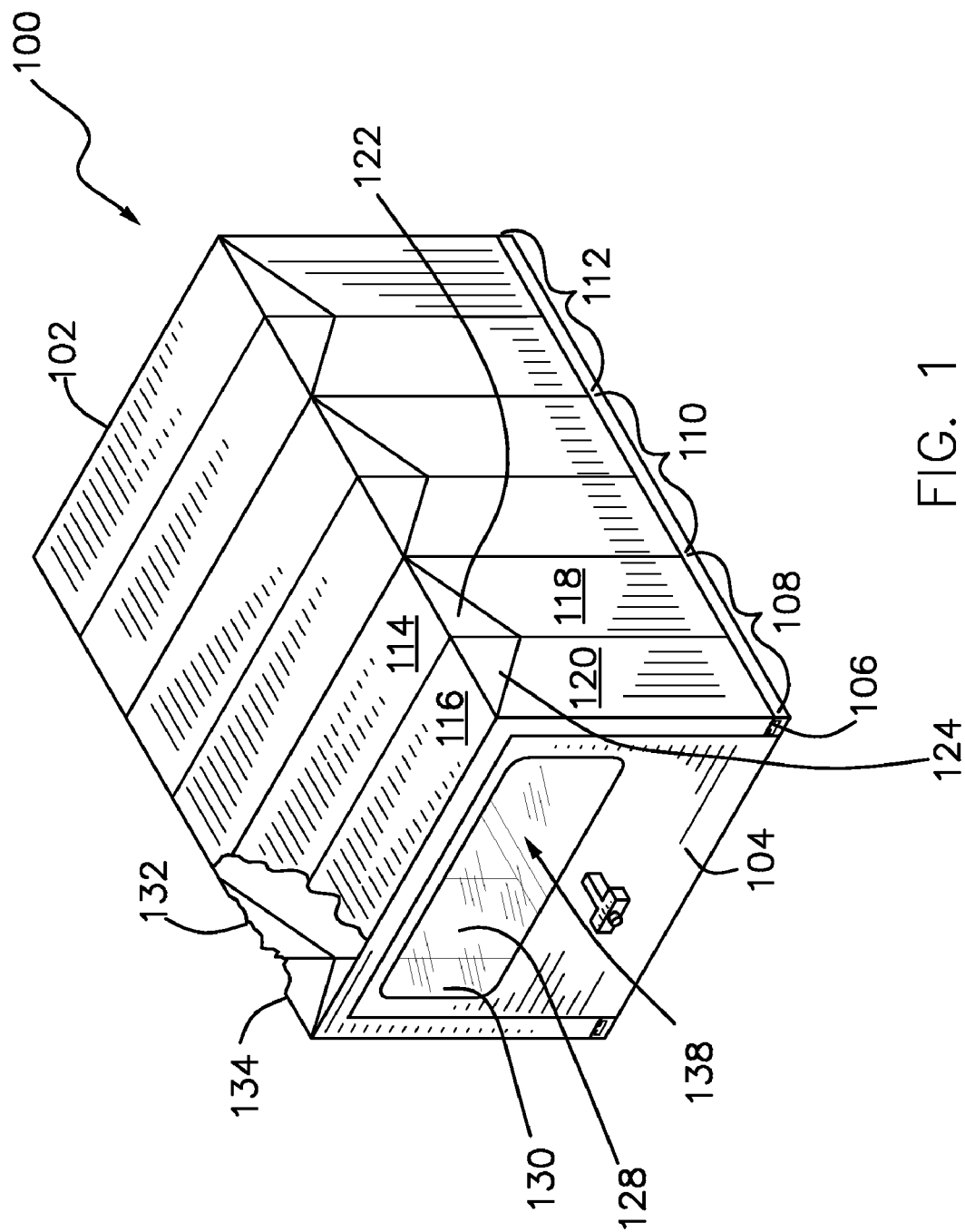
FIG. 1 is an isometric view of a camper shell 100.

FIG. 1 is an isometric view of a camper shell 100. Camper shell 100 may be mounted to a vehicle to protect cargo from the elements. Camper shell 100 may include a plurality of folding sections 102, a door 104, and a base 106. In this example, camper shell 100 may include a first folding section 108, a second folding section 110, and a third folding section 112.

Folding sections 102 may aid in collapsing and expanding camper shell 100. In one example, there may be three fiberglass folding sections that may be expanded to full size to create a cap shape or collapsed against the back of a vehicle cab. Each folding section 102 may have similar elements. First folding section 108 may be typical of these elements.

Figure 2:
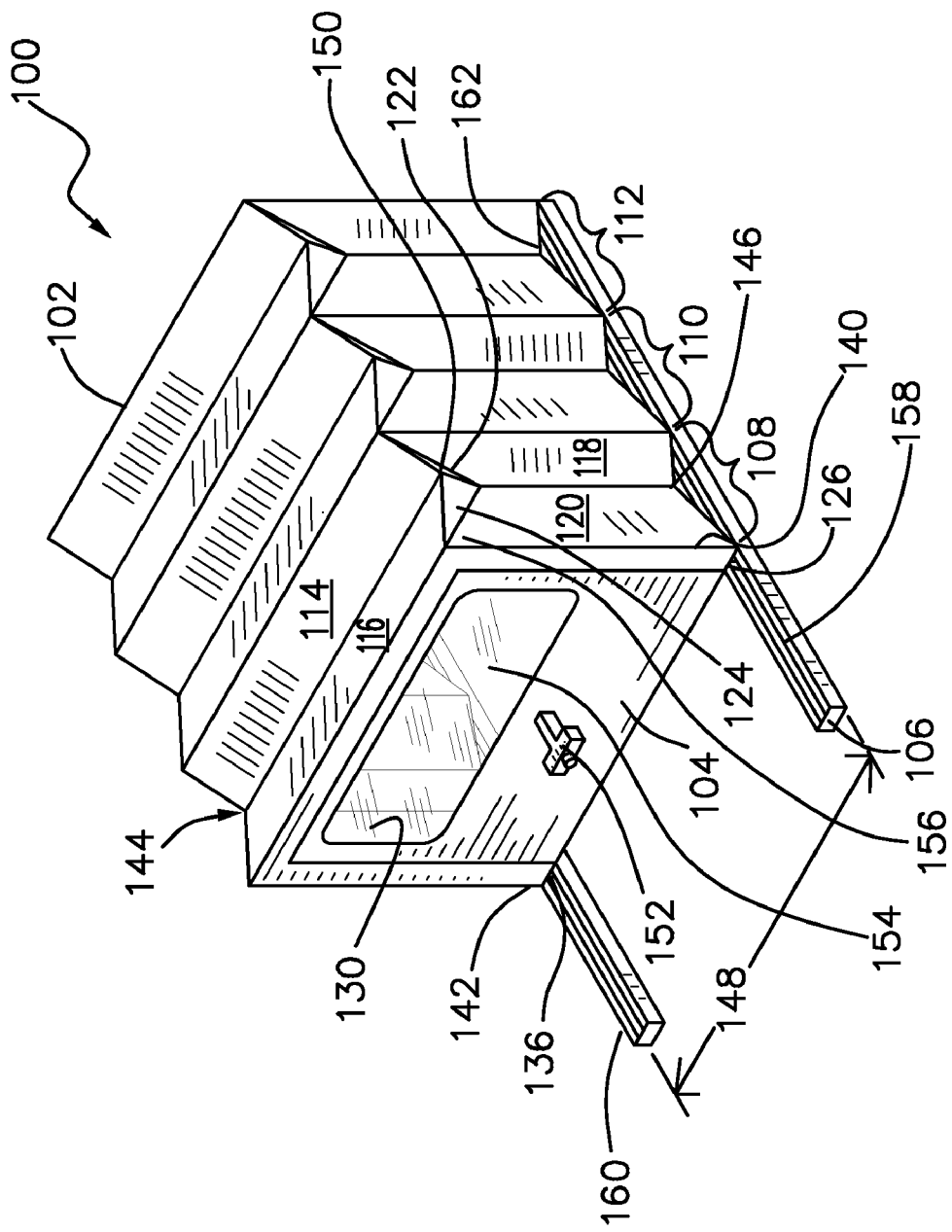
FIG. 2 is an isometric view of camper shell 100 in a partial collapsed or partial expanded state.
Figure 5:
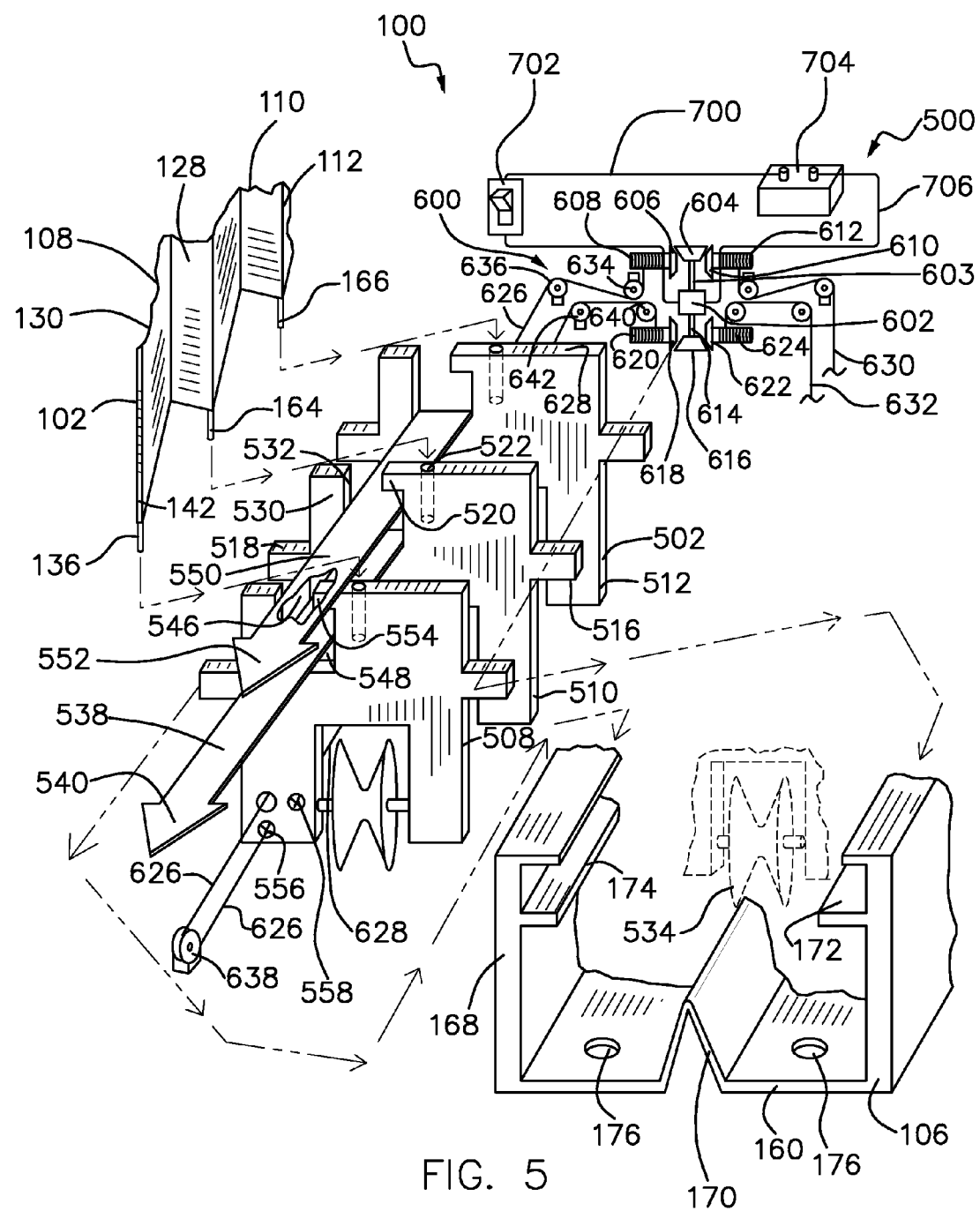
FIG. 5 is an exploded isometric partial assembly view of an activation system 500 for camper shell 100.

First folding section 108 may include a forward top 114, a rear top 116, a right forward side 118, a right rear side 120, a right forward fold 122, a right rear fold 124, and a right post 126 (FIG. 2). First folding section 108 additionally may include a left forward side 128, a left rear side 130, a left forward fold 132, a left rear fold 134, and a left first post 136 (FIG. 2 and FIG. 5). Each top, side, and fold of first fold section 108 may be connected to an adjacent element by a hinge, where a seal may be provided between each adjacent element to keep moisture, dust, and the like out of a camper shell interior 138. The seal may be made of any material to keep moisture, dust, and the like out of a camper shell interior 138, including rubber.

FIG. 2 is an isometric view of camper shell 100 in a partial collapsed or partial expanded state. Right post 126 (FIG. 2) may be connected to right rear side 120 near a rear most bottom corner 140 of right rear side 120. Left first post 136 may be connected to left rear side 130 near a rear most bottom corner 142 of left rear side 130. Right post 126 and left first post 136 may move within base 106 as camper shell 100 is collapsed and expanded.

When fully expanded as in FIG. 1, forward top 114 and rear top 116 substantially may lie in a same plane. When folding sections 102 may be partially expanded as in FIG. 2, forward top 114 and rear top 116 may angle down towards one another to form a V-shaped channel 144. V-shaped channel 144 may aid in draining water from forward top 114 and rear top 116.

When fully expanded as in FIG. 1, right forward side 118, right rear side 120, right forward fold 122, and right rear fold 124 substantially may lie in a same plane. When folding sections 102 may be partially expanded as in FIG. 2, right forward side 118 and right rear side 120 may angle inward towards one another to form an inward directed V-shaped channel 146. Inward directed V-shaped channel 146 may keep camper shell 100 within a width 148 whether camper shell 100 is completely expanded, partially expanded, or completely collapsed.

When folding sections 102 may be partially expanded as in FIG. 2, right forward fold 122 and right rear fold 124 may angle downward away from one another to form an inward directed obtuse angled channel 150. Inward directed obtuse angled channel 150 may keep a collapsed camper shell 100 from forming an upward facing pocket into which water may collect.

Door 104 may be a movable structure that may be utilized to aid in closing off camper shell interior 138. Door 104 may include a handle 152 and a window 154 and be hinged to left rear side 130 (at a location hidden in FIG. 2) and hinged to right rear side 120 near an upper rear location 156. Handle 152 may extend away from door 104 while camper shell 100 is expanded and may be stored while camper shell 100 is collapsed such that door 104 substantially may be flat. Window 154 may permit a driver to see behind the driver from a vehicle cab.

Figure 3:
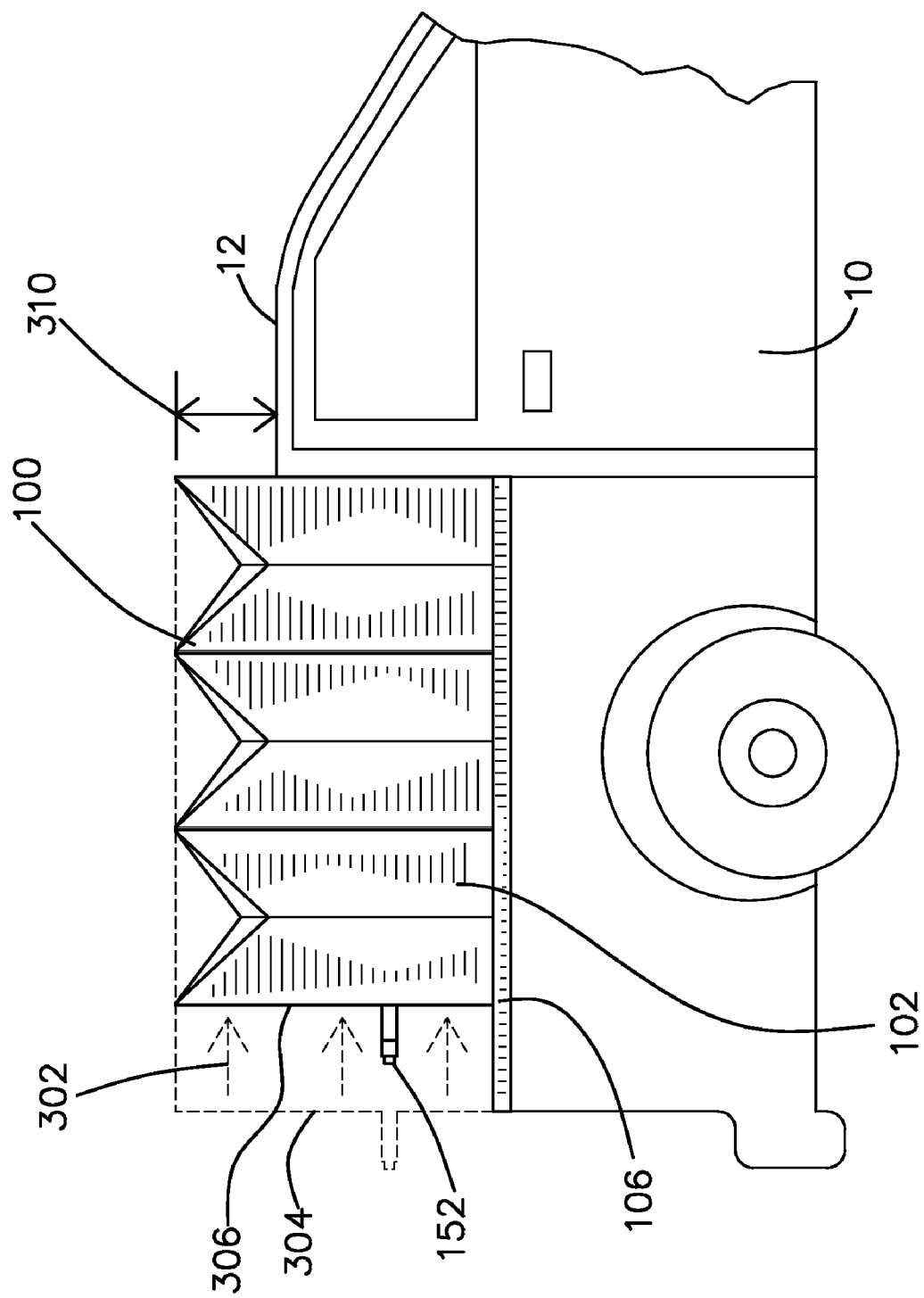
FIG. 3 is a side view of camper shell 100 mounted on a vehicle 10 having a vehicle cab roof 12.

FIG. 3 is a side view of camper shell 100 mounted on a vehicle 10 having a vehicle cab roof 12. Base 106 may be a structure to support and guide camper shell 100 and to provide a connection between camper shell 100 and a vehicle 10. Base 106 may include a right channel 158 (FIG. 2), a left channel 160 (FIG. 2), and a mid channel 162 (FIG. 2) that may be connected between right channel 158 and left channel 160. Right channel 158, left channel 160, and mid channel 162 may be formed from extruded metal or plastic.

Figure 4:
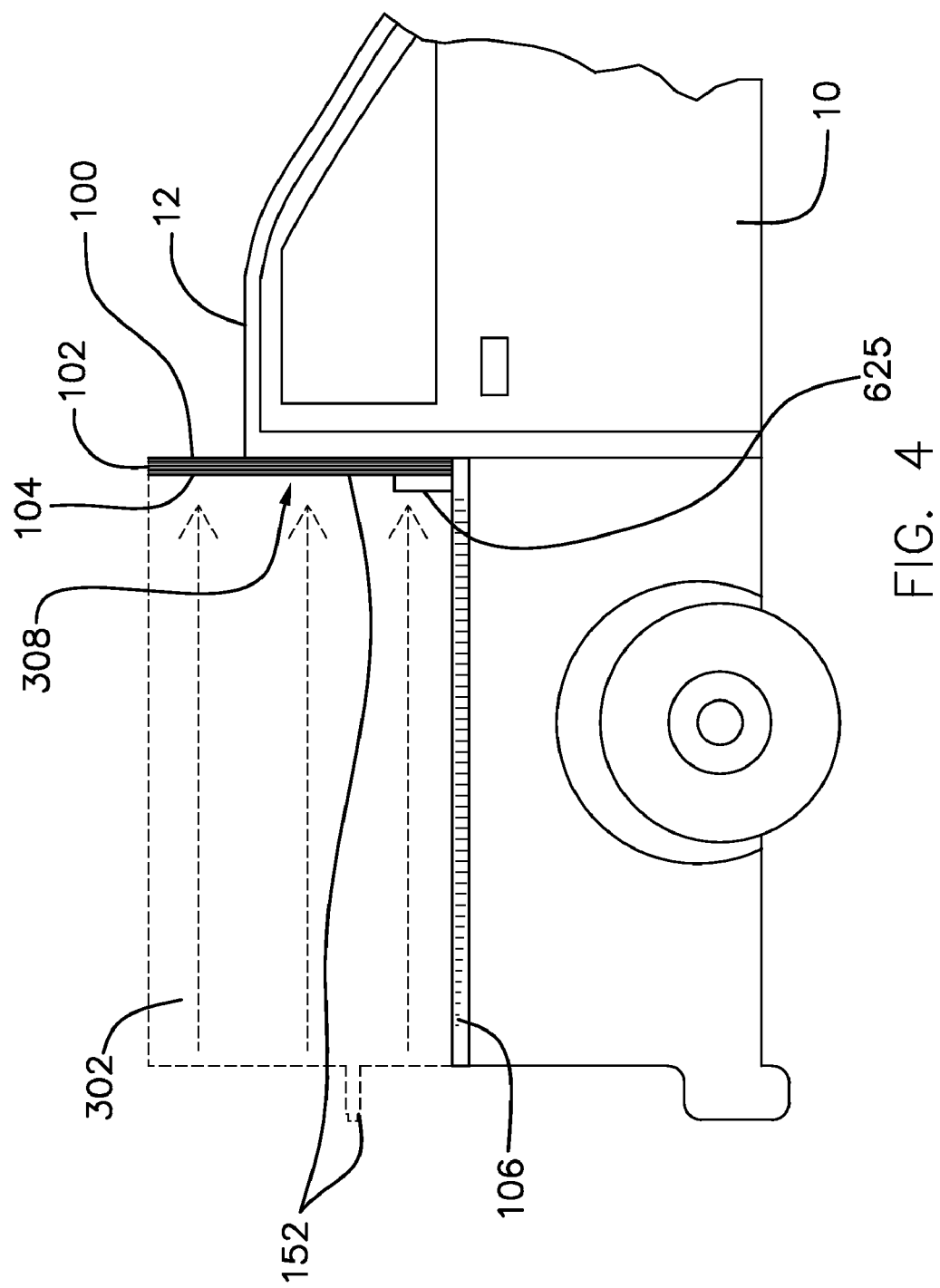
FIG. 4 is a side view of camper shell 100 in a third position 308.

Arrows 302 of FIG. 3 may illustrate movement of camper shell 100 from a first position 304 to second position 306. Camper shell 100 may be in a partially collapsed state in second position 306. FIG. 4 is a side view of camper shell 100 in a third position 308. Camper shell 100 may be in a collapsed state in third position 308 with handle 152 stored such that door 104 substantially may be flat.

A camper shell (sometimes called a truck cap) that conforms to the height and width of the cab may not have much affect on gas mileage. A camper shell that is taller than the truck cab may provide more room, but may provide a noticeable difference in gas mileage from the wind resistance. Although camper shell 100 may extend a height 310 (FIG. 3) above vehicle cab roof 12, camper shell 100 may be flush with cab roof 12 or lower than cab roof 12.

FIG. 5 is an exploded isometric partial assembly view of an activation system 500 for camper shell 100. Activation system 500 may aid in expanding and collapsing camper shell 100. First folding section 108, second folding section 110, third folding section 112, left first post 136, and left channel 160 of base 106 may be viewed in FIG. 5. In addition, a left second post 164 attached to a bottom of second folding section 110 and a left third post 166 attached near a bottom of third folding section 112 may be viewed in FIG. 5.

Activation system 500 may include a plurality of guides 502, a pulley system 600, and a power system 700. Guides 502 may aid in translating movement of pulley system 600 into folding sections 102 of camper shell 100. Power system 700 may provide power to pulley system 600 to permit a user to expand and contract camper shell 100 with the press of a button 702.

There may be one guide 502 for each post 136, 164, and 166 of folding section 102. In this example, left first post 136, left second post 164, and left third post 166 may be associated with a guide 508, a guide 510, and a guide 512, respectively. Although this example illustrates movement of folding sections 102 relative to left channel 160, movement of folding sections 102 relative to right channel 158 (FIG. 2) may be similar. To aid in explaining activation system 500, details of guide 510 first will be addressed.

Figure 6:
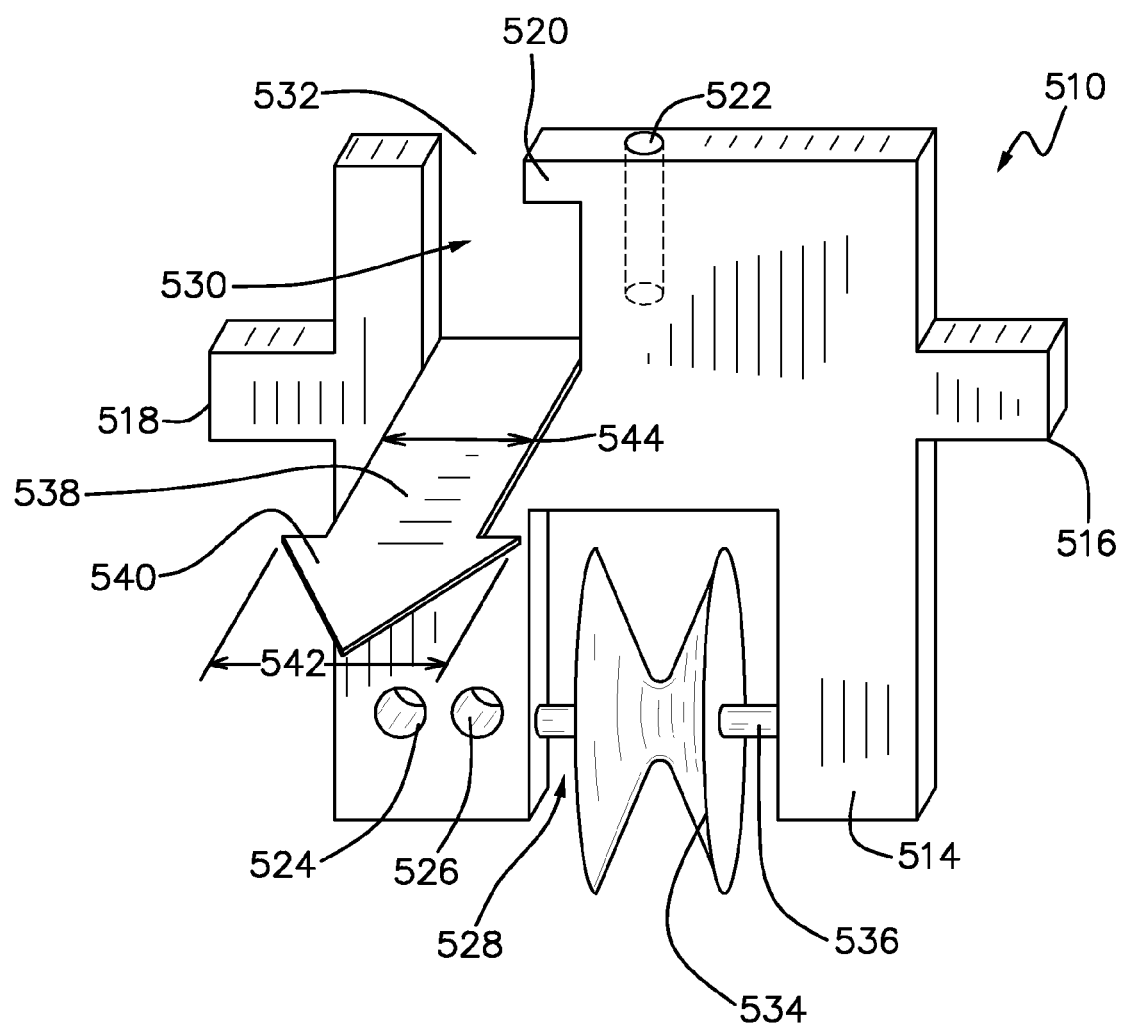
FIG. 6 is an isometric view of guide 510.

FIG. 6 is an isometric view of guide 510. Guide 510 may include a body 514 having a first arm 516, a second arm 518, a boss 520, a cavity 522, an expand hole 524, a collapse hole 526, and a wheel opening 528. Material may be removed from body 514 to form a pathway 530 partially enclosed by boss 520 and partially open by a pathway opening 532. A wheel 534 may be connected in wheel opening 528 by a shaft 536. A tab 538 having a tab head 540 may be attached to body 514 near pathway 530. Tab head 540 may have a tab head width 542 and a tab width 544.

First arm 516 and second arm 518 may move within a first support 172 (FIG. 5) and a second support 174 (FIG. 5) of left channel 160 to aid guide 510 in moving in a desired direction. Boss 520 may aid in securing a tab 538 within pathway 530 and provide an under-support to other tabs 538. Cavity 522 may be adapted to receive left second post 164 (FIG. 5). Expand hole 524 may be utilized with an expansion of camper shell 100 and collapse hole 526 may be utilized with a compression of camper shell 100. Wheel opening 528 may provide room for wheel 534 to rotate. Pathway 530 may be adapted to receive a tab 538 through pathway opening 532.

Wheel 534 may be configured to turn around shaft 536, where shaft 536 may be passed through a center of wheel 534 and be connected to wheel opening 528. Tab 538 may be may be utilized with an expansion of camper shell 100. Tab head width 542 may be greater than tab width 544 of tab 538. The additional width of tab head width 542 may aid in maintaining tab 538 interlocked with a pathway 530 (FIG. 5) of guide 508.

Guides 502 of FIG. 5 may be assemble as follows. Tab 538 of guide 510 may be rotated and passed through a pathway opening 546 of guide 508 and into a pathway 548 of guide 508. A tab 550 of guide 512 having a tab head 552 may be rotated and passed through pathway opening 532 and into pathway 530 of guide 510. Tab 550 may be place above a boss 554 of guide 508. Like one train car pulling an immediate adjacent train car, the securing of tab 538 and tab 550 within guide 508 and guide 510, respectively, permit one guide to pull an immediate adjacent guide. In other words, guide 508 may pull guide 510, and guide 510 may pull guide 512. An effect of these guides moving as such is that folding sections 102 may move relatively smoothly and in unison. Since guide 508 may be a lead guide, guide 508 need not include a tab.

Pulley system 600 may include a motor 602, an expand motor shaft 603, an expand conical gear 604, a left expand conical gear 606, a left expand drum 608, a right expand conical gear 610, and a right expand drum 612. Pulley system 600 additionally may include a collapse motor shaft 614, a collapse conical gear 616, a left collapse conical gear 618, a left collapse drum 620, a right collapse conical gear 622, and a right collapse drum 624. Motor 602 and the shafts, gears, and drums may be contained within a motor housing 625 (FIG. 4). Pulley system 600 further may include a left expand cable 626, a left collapse cable 628, a right expand cable 630, a right collapse cable 632, a first pulley 634, a second pulley 636, a third pulley 638, a fourth pulley 640, and a fifth pulley 642.

Motor 602 may be a device that may convert a form of energy into mechanical motion. For example, motor 602 may include an arrangement of coils and magnets that may convert electric current into mechanical power. Motor 602 may be a reversible electric motor.

Motor 602 may be connected to expand conical gear 604 through expand motor shaft 603 and may be connected to collapse conical gear 616 through collapse motor shaft 614. In both cases, motor 602 independently may impart rotary motion into expand conical gear 604 and into collapse conical gear 616.

This example of pulley system 600 may require a ninety-degree change in the axes of rotary motion rotation. Where two axles cross at point and engage by means of a pair of conical gears, the gears themselves may be referred to as bevel gears. Bevel gears may enable a change in the axes of rotation of the respective shafts, commonly ninety degrees. Helical gears also may be designed to allow a ninety-degree rotation of the axis of rotation.

Expand conical gear 604 may engage left expand conical gear 606 connected to left expand drum 608 and may engage right expand conical gear 610 connected to right expand drum 612. Thus, when expand conical gear 604 rotates, both left expand drum 608 and right expand drum 612 may rotate. As discussed in more detail below, this may expand the left side and right side of folding section 102 such that camper shell 100 may expand uniformly.

One end of left expand cable 626 may be wrapped around left expand drum 608. Left expand cable 626 may be wrapped about first pulley 634, second pulley 636, and passed through the expand holes of guide 512, guide 510 (expand hole 524 of FIG. 6), and guide 508. Left expand cable 626 may be wrapped about third pulley 638, and attached to guide 508 at attachment 556 (FIG. 5).

Third pulley 638 may provide a one hundred eighty degree change in direction for expand cable 626. Thus, as expand cable 626 is wound about left expand drum 608, expand cable 626 may pull on guide 508 at attachment 556 to move guide 508 away from motor 602. As guide 508 moves away from motor 602, tab head 540 of tab 538 may catch the body of guide 508 near pathway 548 and pull along guide 510. Guide 510 may pull along guide 512 in a similar fashion. With guide 508, guide 510, and guide 512 moving away from motor 602, a left side of first folding section 108, second folding section 110, and third folding section 112 may move and expand. Right expand cable 630 may be wrapped about right expand drum 612 and similarly may cause a right side of folding sections 102 to move and expand.

Collapsing camper shell 100 may be achieved with left collapse cable 628 and right collapse cable 632 together pulling folding sections 102 towards motor 602. One end of left collapse cable 628 may be wrapped about left collapse drum 618. Left collapse cable 628 may be wrapped about fourth pulley 640 and fifth pulley 642 and then passed through the collapse holes of guide 512, guide 510 (collapse hole 526 of FIG. 6), and then guide 508. Left collapse cable 628 may be attached to guide 508 at attachment 558 (FIG. 5). As left collapse cable 628 is wound about left collapse drum 618, left collapse cable 628 may pull on guide 508 at attachment 558 to move guide 508 towards motor 602.

As guide 508 moves towards motor 602, guide 508 may contact guide 510 and push guide 510 forward. Guide 510 may contact guide 512 and push guide 512 forward. Right collapse cable 632 may be wound around right collapse drum 624 to pull the guides on the right side of camper shell 100 towards motor 602. Left collapse cable 628 and right collapse cable 632 may continue to pull on their respective guides until camper shell 100 has collapsed as in FIG. 4.

Power system 700 of FIG. 5 may aid in moving folding sections 102. Power system 700 may include a switch 702, a battery 704, and wiring 706 connecting switch 702, battery 704, and motor 602. Switch 702 may be a device utilized to close an electric circuit. Switch 702 may be located within the cab of vehicle 10 and operated by a driver to control the expanding and collapsing of camper shell 100.

Battery 704 may be any device that may produce direct current (DC) by converting chemical energy to electrical energy. Battery 704 may be part of a 12-volt DC electrical system of vehicle 10 or a battery dedicated to camper shell 100. Wiring 706 may include any material to conduct electricity. Wiring 706 may be insulated.

As noted above, base 106 may be a structure to support and guide camper shell 100 and to provide a connection between camper shell 100 and vehicle 10. FIG. 5 illustrates an isometric partial view of left channel 160. Left channel 160 may include an overall U-shape 168, a guide track 170, first support 172, second support 174, and a fastener holes 176.

Guide track 170 may be a shape upon which wheel 534 (FIG. 6) and other wheels of the guide 508 and guide 512 may run. Guide track 170 may have an angled shape to fit a yo-yo shape of wheel 534. First support 172 and second support 174 may provide support to the arms of each guide, including first arm 516 (FIG. 6) and second arm 518 of guide 510. Left channel 160 may be installed atop bed walls of vehicle 10 (FIG. 3) by passing fasteners through fastener holes 176. In operation, first support 172 and second support 174 may work with guide track 170 to guide the folding sections 106 in and out in a smooth and controlled manner.

Figure 7:
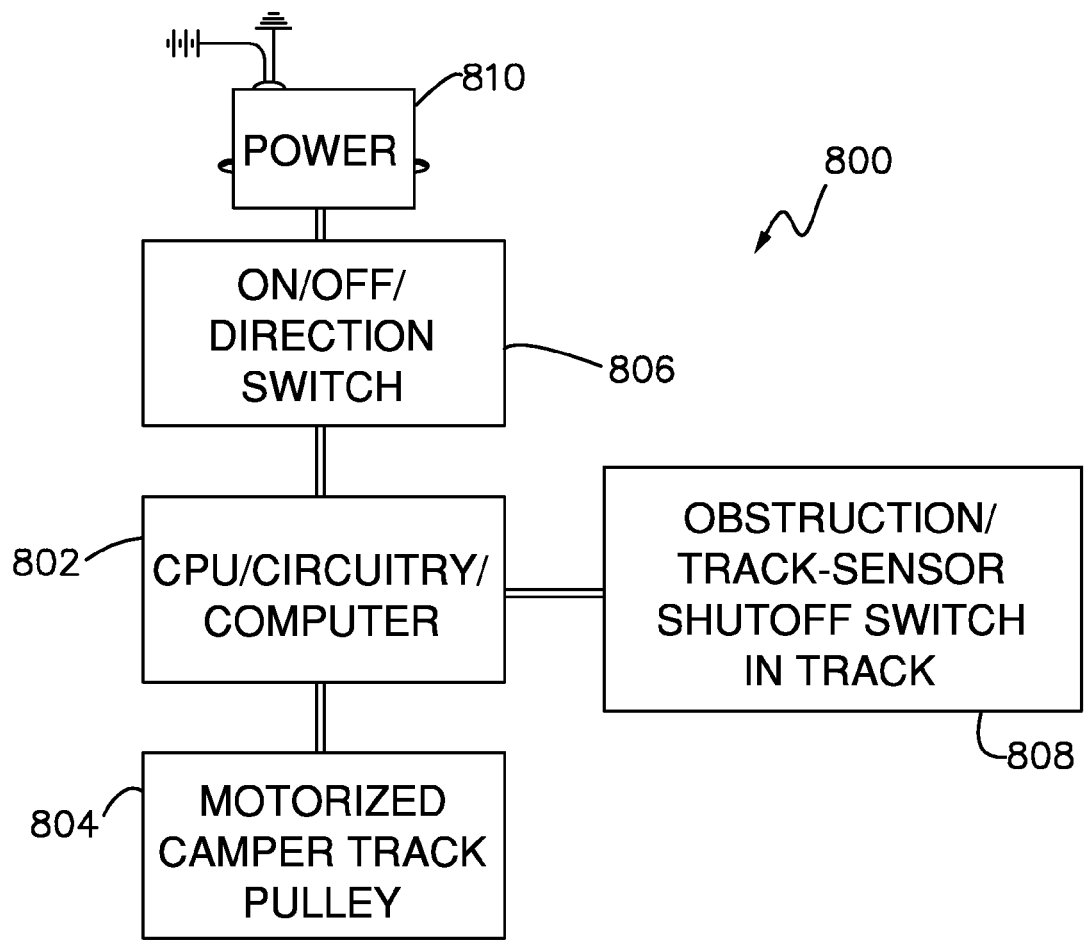
FIG. 7 is an electrical circuit flow diagram 800 for camper shell 100.

FIG. 7 is an electrical circuit flow diagram 800 for camper shell 100. A computer 802 may communicate with a motor 804, an on/off switch 806, and a sensor 808. On/off switch 806 may permit power 810 to flow to motor 804. Sensor 808 may be a track sensor configured to detect whether something is preventing camper shell 100 from moving. If sensor 808 detects an obstruction, sensor 808 may send a signal to computer 802 to prevent power from reaching motor 804 by shutting off on/off switch 806.

Figure 8:
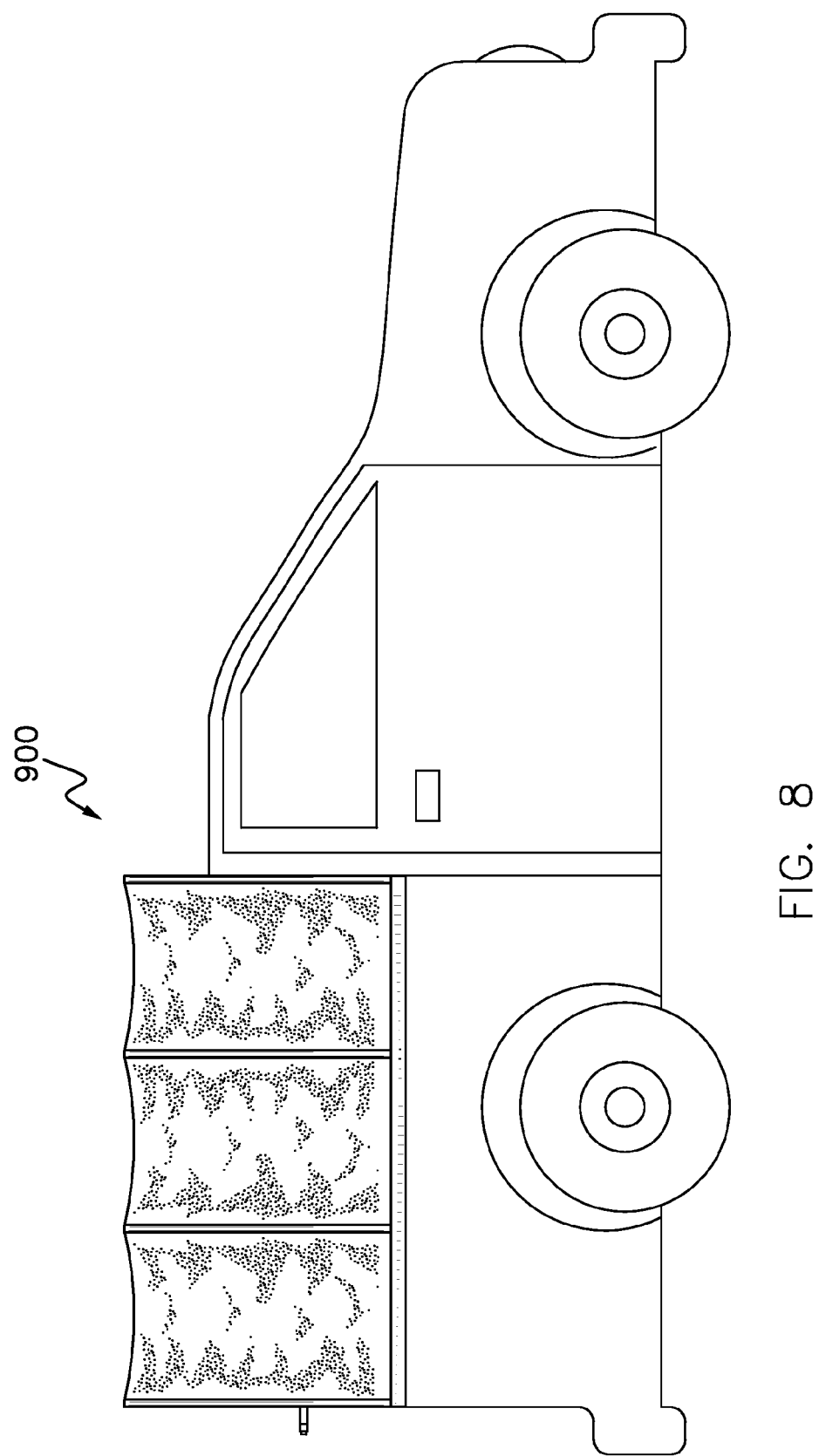
FIG. 8 is a side view of camper shell 900.

FIG. 8 is a side view of camper shell 900. Camper shell 900 may include a canvas cap-like covering as an alternative to a fiberglass motorized design. Camper shell 900 may be manually adjusted between a collapsed position and expanded position.

The camper shell may be a collapsible cap for the rear box space of a pickup truck. The camper shell easily may be converted from an open-air cargo carrier to a protective enclosure and vice versa. This may eliminate repeated application and removal of a heavy solid cap at the rear of the truck and provide added convenience and versatility for the pickup owner.

When a strong protective covering is needed for a load carried in a truck bed, a motor may be activated to expand the fiberglass sections towards a tailgate to create the full-size cap shape. In this extended and locked position, any belongings within the bed may be protected from rain, bright sunlight, snow, sleet, and other adverse weather conditions. When fully expanded, the camper shell may measure approximately three feet tall, six feet long, and four feet wide.

If the truck owner needed full, open access to the bed to haul larger or bulky cargo, the control button may be activated for the electric motor to retract the camper shell. The sections may slide smoothly through the guide tracks along the upper bed walls and be secured in this collapsed state behind the cab. This may open and free the entire bed space for hauling bulky loads. The camper shell may be installed on aftermarket pickups and offered as standard or optional equipment with new production trucks.

The camper shell may fulfill the need for a collapsible cap for use on pickup trucks. Appealing features of the camper shell may include its ease of use, convenience, and versatility. Instead of relying upon others to help remove or install a heavy one-piece cap, the camper shell may be quickly collapsed or opened as required by a single person. The motor-driven fiberglass sections may simply slide towards the rear of the cab and collapse into a compact state. This may eliminate the need to remove mounting bolts to lift, detach, and store a heavy, bulky shell when an open bed was needed for hauling cargo. The adjustable design may make the pickup truck more versatile and easily adaptable to the owner's ever-changing hauling requirements. The camper shell may provide full weather and theft protection when completely expanded and locked over the bed space. The camper shell also may be very strong, secure, reliable, attractively styled, and corrosion resistant.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A camper shell for a vehicle, the camper shell comprising:
    a plurality of folding sections, where a first folding section includes a forward top, a rear top, a right forward side, a right rear side, a right forward fold, and a right rear fold, where the forward top is connected to the rear top and the right forward fold, the rear top is connected to the right rear fold, the right forward fold is connected to the right forward side, and the right rear fold is connected to the right rear side;
    a right post extending from a bottom of the right rear side near a rear corner of the right rear side, where each folding section includes a right rear side and includes only one post extending from a bottom of each right rear side near a rear corner of each right rear side;
    a door connected to the first folding section; and
    a base connected to the plurality of folding sections, where the base includes a right channel and a left channel, where the right post is configured to move within the base as the camper shell is collapsed and expanded.

2. The camper shell of claim 1, where, when the plurality of folding sections are partially expanded, the right forward side and the right rear side angle inward towards one another to form an inward directed V-shaped channel and the right forward fold and the right rear fold angle downward away from one another to form an inward directed obtuse angled channel.

3. The camper shell of claim 1, where the base further includes a mid channel that is connected between the right channel and the left channel.

4. The camper shell of claim 1, where there are three folding sections, where the folding sections include fiberglass.

5. The camper shell of claim 1, further comprising:
    an activation system having a plurality of guides connected to the plurality of folding sections, a pulley system connected to the guides, and a power system configured to communicate with the pulley system.

6. The camper shell of claim 5, where there are only two guides for each folding section.

7. The camper shell of claim 5, where the plurality of guides includes a first guide and where the first guide includes a body having a first arm, a second arm, a boss, a cavity, an expand hole, a collapse hole, a wheel opening, a pathway partially covered by the boss and partially open by a pathway opening, and a wheel connected to the wheel opening by a shaft.

8. The camper shell of claim 7, where the first guide further includes a tab having a tab head, where the tab is attached to the body near the pathway.

9. The camper shell of claim 5, where the pulley system includes a motor, an expand motor shaft, an expand conical gear, a left expand conical gear, a left expand drum, a right expand conical gear, a right expand drum, a collapse motor shaft, a collapse conical gear, a left collapse conical gear, a left collapse drum, a right collapse conical gear, and a right collapse drum, a left expand cable, a left collapse cable, a right expand cable, a right collapse cable, a first pulley, a second pulley, a third pulley, a fourth pulley, and a fifth pulley.

10. The camper shell of claim 9, where a first end of the left expand cable is wrapped around the left expand drum and a second end is wrapped around the first pulley, the second pulley, is passed through expand holes of the plurality of guides, wrapped around the third pulley, and attached to a guide.

11. The camper shell of claim 9, where a first end of the left collapse cable is wrapped around the left collapse drum, a second end of the left collapse cable is wrapped around the fourth pulley, wrapped around the fifth pulley, is passed through collapse holes of the plurality of guides, and attached to a guide.

12. The camper shell of claim 5, where the power system includes a switch, a battery, and wiring connected between the switch, the battery, and the motor, where the battery is dedicated to the motor.

13. The camper shell of claim 1, where the left channel includes an overall U-shape, a guide track, a first support, a second support, and fastener holes, where the guide track is remote from the first support and the second support and where the guide track has an angled shape configured to fit a yo-yo shaped wheel.

14. The camper shell of claim 1, where the camper shell measures approximately three feet tall, six feet long, and four feet wide.

15. A camper shell for a vehicle, the camper shell comprising:
    a plurality of folding sections, where a first folding section includes a forward top, a rear top, a right forward side, a right rear side, a right forward fold, and a right rear fold, where the forward top is connected to the rear top and the right forward fold, the rear top is connected to the right rear fold, the right forward fold is connected to the right forward side, and the right rear fold is connected to the right rear side;
    a right post connected to the right rear side near a rear most bottom corner of the right rear side;
    a door connected to the first folding section;
    a base connected to the plurality of folding sections, where the base includes a right channel and a left channel; and
    an activation system having a plurality of guides connected to the plurality of folding sections, a pulley system connected to the guides, and a power system configured to communicate with the pulley system, where the plurality of guides includes a first guide and where the first guide includes a body having a first arm, a second arm, a cavity, an expand hole, a collapse hole, a wheel opening, a pathway, and a wheel connected to the wheel opening by a shaft.

16. The camper shell of claim 15, where, when the plurality of folding sections are partially expanded, the right forward side and the right rear side angle inward towards one another to form an inward directed V-shaped channel and the right forward fold and the right rear fold angle downward away from one another to form an inward directed obtuse angled channel.

17. The camper shell of claim 15, where the base further includes a mid channel that is connected between the right channel and the left channel, where the right channel, the left channel, and the mid channel are formed from extruded material and connect to form a structure to support the plurality of folding sections and to provide a connection between the plurality of folding sections and the vehicle.

18. The camper shell of claim 15, where there are three folding sections, where the folding sections include fiberglass.

19. The camper shell of claim 15, where the body of the first guide further includes a boss and where the pathway partially is covered by the boss and partially open by a pathway opening.

* * * * *